Patented Jan. 2, 1945

2,366,531

UNITED STATES PATENT OFFICE 2,366,531

DEHYDROGENATION OF HYDROCARBONS

Vladimir N. Ipatieff and Vladimir Haensel, Chicago, Ill., assignors to Universal Oil Products Company, Chicago, Ill., a corporation of Delaware No Drawing. Application April 6, 1940,
Serial No. 328,318

5 Claims. (Cl. 260—683.3)

This invention relates to the manufacture of composite catalysts consisting of metals on refractory supports and in a more specific sense is concerned with catalysts within this group which are useful in effecting the dehydrogenation of various types of hydrocarbons.

Dehydrogenation of paraffinic hydrocarbons, such as butane, to produce olefins, and of monoolefins to produce di-olefins may be carried out effectively in the presence of properly chosen catalytic materials. During such dehydrogenation reactions other decomposition reactions occur with the result that the catalytic material becomes coated with highly polymerized or carbonaceous materials which eventually reduce its activity to a relatively low value. During the reactivation step comprising oxidation with air or other oxygen-containing gas mixtures to burn off this carbonaceous material, some of the metallic constituents of the catalyst may be oxidized and the present process applies also to the subsequent necessary step involving the reduction of the oxides back to the catalytic metals.

In one specific embodiment the present invention comprises a process for the manufacture of composite catalysts consisting of metals and refractory supports which consists in mixing oxides of metals with said refractory supports, pilling or otherwise forming the uniformly mixed material and reducing with carbon monoxide or mixtures of carbon monoxide and hydrogen at relatively low temperatures to produce reduced metals of relatively porous character.

We have found that the temperatures necessary to effect substantial reduction of metal oxides mixed with refractory supports are generally lower when carbon monoxide is used than when hydrogen or other reducing gases are used. In the case of any particular oxide or mixture of oxides minimum practical temperatures of reduction are chosen which will effect the desired reduction to metal with the retention of a maximum degree of activity. This is particularly essential in the case of mixtures of the oxides of metals which have a tendency to fuse or alloy at some particular temperature, depending obviously upon the proportions of the metals present. As will be shown in later examples there are instances wherein it is practically impossible to reduce mixtures of certain oxides without causing a degree of fluxing or alloying which destroys the porosity of the reduced metals to an extent rendering them substantially ineffective as catalysts. It is comprised within the scope of the invention whenever feasible to employ hydrogen in admixture with carbon monoxide when the oxides which are to be reduced will stand the required temperatures of reduction without undergoing the undesirable fluxing and loss of porosity, and in any case the temperature and proportioning of carbon monoxide and hydrogen will be chosen to attain the maximum practical efficiency when considering both the efficiency of the catalyst and the time required for the reduction.

The principles of the present invention are particularly applicable to the production of certain catalysts useful in dehydrogenating various types of hydrocarbons, and consisting as finally prepared of zinc, copper, and alumina and also to analogous mixtures in which the copper is replaced by nickel or other members of the iron group including iron and cobalt. In making up these catalysts, powdered zinc oxide, powdered copper oxide, and a powdered refractory and substantially inert carrier such as alumina, are intimately and uniformly mixed and pilled or otherwise formed with or without the addition of a small quantity of a lubricating material. The formed particles are then placed in a chamber in which they are intended to be used as a catalyst, and carbon monoxide gas is passed through the bed of material at some temperature to be used in later dehydrogenation operation within the approximate range of 450–700° C. and at an hourly gaseous space velocity of the order of 500–1500. Following this preparation, the catalyst may be used in situ for the dehydrogenation of hydrocarbons such as normally gaseous paraffins or olefins or normally liquid hydrocarbons including naphthenes. After the catalyst has become spent due to the accumulation of carbonaceous deposits it is treated with oxygen or air to burn off carbon and its activity may then be restored by the use of carbon monoxide or a mixture of carbon monoxide and hydrogen under substantially the same conditions of temperature and rate of flow as were employed in the preparation, and owing to the fact that minimum temperatures of reduction are utilized, this cycle may be repeated over a long period of time without substantial reduction in the activity of the catalyst. Catalysts of the present character may be employed for the dehydrogenation of gaseous paraffins at temperatures within the approximate range of 450–700° C. and space velocities of the order of 200–10,000 to produce substantial yields of the corresponding olefins and may be used in the treatment of butenes to produce butadiene at temperatures within the approximate range of 550–650° C. and space velocities of the same order. When employed to dehydrogenate normally liquid paraffins or hydro-aromatics, the temperatures employed are usually within the approximate range of 400–600° C. and the liquid space velocities are usually within the range of 0.5–10. Pressures employed are normally atmospheric, but subatmospheric or superatmospheric may be employed if advantages are gained thereby.

As a general rule, catalysts formed by pelleting or other forming methods by the present process combine a relatively high structural strength or resistance to crushing with a high porosity and a high catalytic activity.

The term space velocity as used in the present specification and claims refers to the volumes of gases or the volume of liquids passing as vapors through the space occupied by the catalytic material per hour.

The following example of manufacture and use of a catalyst prepared by the process of the present invention is given for illustrative purposes to show its practical value and not with the intention of unduly circumscribing the proper scope of the invention.

20% zinc oxide powder, 20% copper oxide powder, and 60% aluminum oxide powder were carefully mixed and pelleted to produce short cylindrical pellets of approximately 1/8" diameter and 1/8" length using a small amount of lubricant to prevent sticking of the dies in the pelleting machine. The pellets thus prepared were divided into three portions. One portion was heated in a stream of nitrogen at the operating temperature to remove lubricant and was then utilized to dehydrogenate propane to produce propene at a temperature of 600° C. as indicated in the following table. The second portion was heated in the nitrogen stream in the same manner but was then further pretreated with carbon monoxide prior to use in the dehydrogenation of propane. The third portion was also heated in the nitrogen stream in the same manner but was then pretreated with hydrogen prior to use in the dehydrogenation of propane. It will be observed from the following data, indicating the general results obtained that the material which was not pretreated with carbon monoxide had a low activity as indicated by the propene production while the material which had been treated with carbon monoxide had a relatively high activity. It was found that reduction with hydrogen instead of carbon monoxide does not result in as complete reduction at a given operating temperature as is the case when carbon monoxide is used. Thus it can be seen that the catalyst reduced with hydrogen shows a higher activity than the non-pretreated catalyst, but is still inferior to the carbon monoxide pretreated catalyst.

| Catalyst | Temperature | | Space velocity | Moles exit gas | Analysis of Exit gas | |
|---|---|---|---|---|---|---|
| | °C. | °F. | | 100 moles of propane chgd. | Moles $C_3H_6$ per 100 moles of $C_3H_8$ chgd. | Moles $C_2H_4$ per 100 moles of $C_3H_8$ chgd. |
| Not pretreated with carbon monoxide | 600 | 1,112 | 700 | 119 | 8.6 | 1.9 |
| Pretreated with carbon monoxide | 600 | 1,112 | 1,025 | 141 | 25.5 | 1.3 |
| Pretreated with hydrogen | 601 | 1,119 | 1,160 | 131 | 14.2 | 1.3 |

We claim as our invention:

1. A process for dehydrogenating hydrocarbons which comprises subjecting the hydrocarbons under dehydrogenating conditions to the action of a catalyst resulting from the reducing treatment of shaped bodies of zinc oxide, copper oxide and alumina in the presence of carbon monoxide.

2. A process for dehydrogenating hydrocarbons which comprises subjecting the hydrocarbons under dehydrogenating conditions to the action of a catalyst prepared by forming into shaped bodies a mixture of a refractory material and a metal oxide capable of being reduced to metal with carbon monoxide at a temperature in the approximate range of 450–700° C. and subjecting said bodies to the action of carbon monoxide at a temperature within said range to reduce said oxide to metal.

3. A process for dehydrogenating hydrocarbons which comprises subjecting the hydrocarbons under dehydrogenating conditions to the action of a catalyst prepared by forming into shaped bodies a mixture of zinc oxide, copper oxide and alumina and subjecting said bodies to the reducing action of carbon monoxide at a temperature in the approximate range of 450–700° C.

4. The process as defined in claim 2 further characterized in that said bodies are subjected to the action of hydrogen in addition to the carbon monoxide.

5. The process as defined in claim 3 further characterized in that said bodies are subjected to the action of hydrogen in addition to the carbon monoxide.

VLADIMIR N. IPATIEFF.
VLADIMIR HAENSEL.